US008977804B1

(12) United States Patent
Horn

(10) Patent No.: US 8,977,804 B1
(45) Date of Patent: Mar. 10, 2015

(54) VARYING DATA REDUNDANCY IN STORAGE SYSTEMS

(75) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 472 days.

(21) Appl. No.: 13/301,567

(22) Filed: Nov. 21, 2011

(51) Int. Cl.
G06F 12/02 (2006.01)

(52) U.S. Cl.
USPC .......................................... 711/103; 711/114

(58) Field of Classification Search
CPC .............. G06F 12/0246; G06F 3/0679; G06F 2212/2022; G11C 16/102
USPC ................................................. 711/103, 114
See application file for complete search history.

(56) References Cited

U.S. PATENT DOCUMENTS

| | | | |
|---|---|---|---|
| 5,333,138 A | 7/1994 | Richards et al. | |
| 5,392,244 A * | 2/1995 | Jacobson et al. | 711/114 |
| 5,581,785 A | 12/1996 | Nakamura et al. | |
| 5,586,291 A | 12/1996 | Lasker et al. | |
| 6,016,530 A | 1/2000 | Auclair et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,487,636 B1 * | 11/2002 | Dolphin et al. | 711/114 |
| 6,661,591 B1 | 12/2003 | Rothberg | |
| 6,662,267 B2 | 12/2003 | Stewart | |
| 6,687,850 B1 | 2/2004 | Rothberg | |
| 6,725,342 B1 | 4/2004 | Coulson | |
| 6,754,021 B2 | 6/2004 | Kisaka et al. | |
| 6,785,767 B2 | 8/2004 | Coulson | |
| 6,807,630 B2 | 10/2004 | Lay et al. | |
| 6,856,556 B1 | 2/2005 | Hajeck | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,126,857 B2 | 10/2006 | Hajeck | |
| 7,136,973 B2 | 11/2006 | Sinclair | |
| 7,142,385 B2 | 11/2006 | Shimotono et al. | |
| 7,308,531 B2 | 12/2007 | Coulson | |
| 7,334,082 B2 | 2/2008 | Grover et al. | |
| 7,356,651 B2 | 4/2008 | Liu et al. | |
| 7,395,452 B2 | 7/2008 | Nicholson et al. | |
| 7,411,757 B2 | 8/2008 | Chu et al. | |
| 7,424,577 B2 | 9/2008 | Bali et al. | |
| 7,430,136 B2 | 9/2008 | Merry, Jr. et al. | |
| 7,447,807 B1 | 11/2008 | Merry et al. | |
| 7,461,202 B2 | 12/2008 | Forrer, Jr. et al. | |

(Continued)

OTHER PUBLICATIONS

U.S. Appl. No. 12/720,568, filed Mar. 9, 2010, 22 pages.
Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.
Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

(Continued)

*Primary Examiner* — Yong Choe

(57) ABSTRACT

A disk drive is disclosed that varies its data redundancy policy for caching data in non-volatile solid-state memory as the memory degrades. As the non-volatile memory degrades, the redundancy of data stored in the non-volatile memory can be increased to counteract the effects of such degradation. Redundant data can be used to recover data stored in the non-volatile memory in case of a data corruption. Performance improvements and reduced costs of disk drives can thereby be attained.

21 Claims, 6 Drawing Sheets

(56) References Cited

U.S. PATENT DOCUMENTS

| | | | |
|---|---|---|---|
| 7,472,222 B2 | 12/2008 | Auerbach et al. | |
| 7,477,477 B2 | 1/2009 | Maruchi et al. | |
| 7,502,256 B2 | 3/2009 | Merry, Jr. et al. | |
| 7,509,441 B1 | 3/2009 | Merry et al. | |
| 7,509,471 B2 | 3/2009 | Gorobets | |
| 7,516,346 B2 | 4/2009 | Pinheiro et al. | |
| 7,596,643 B2 | 9/2009 | Merry, Jr. et al. | |
| 7,610,438 B2 | 10/2009 | Lee et al. | |
| 7,613,876 B2 | 11/2009 | Bruce et al. | |
| 7,631,142 B2 | 12/2009 | Nishide et al. | |
| 7,634,585 B2 | 12/2009 | Conley et al. | |
| 7,644,231 B2 | 1/2010 | Recio et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,360 B1 | 3/2010 | Brunnett et al. | |
| 7,685,374 B2 | 3/2010 | Diggs et al. | |
| 7,725,661 B2 | 5/2010 | Liu et al. | |
| 7,733,712 B1 | 6/2010 | Walston et al. | |
| 7,752,491 B1 | 7/2010 | Liikanen et al. | |
| 7,765,373 B1 | 7/2010 | Merry et al. | |
| 7,831,634 B2 | 11/2010 | Petev et al. | |
| 7,861,038 B2 | 12/2010 | Fontenot et al. | |
| 7,898,855 B2 | 3/2011 | Merry, Jr. et al. | |
| 7,912,991 B1 | 3/2011 | Merry et al. | |
| 7,934,053 B2 | 4/2011 | Chen et al. | |
| 7,936,603 B2 | 5/2011 | Merry, Jr. et al. | |
| 7,962,685 B2 | 6/2011 | Cheung et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,745,277 B2 | 6/2014 | Kan | |
| 2001/0018728 A1 | 8/2001 | Topham et al. | |
| 2005/0125614 A1 | 6/2005 | Royer, Jr. | |
| 2005/0172082 A1 | 8/2005 | Liu et al. | |
| 2005/0251617 A1 | 11/2005 | Sinclair et al. | |
| 2006/0080501 A1 | 4/2006 | Auerbach et al. | |
| 2006/0143360 A1 | 6/2006 | Petev et al. | |
| 2006/0143427 A1 | 6/2006 | Marwinski et al. | |
| 2006/0143507 A1* | 6/2006 | Tanaka | 714/6 |
| 2006/0195657 A1 | 8/2006 | Tien et al. | |
| 2006/0248124 A1 | 11/2006 | Petev et al. | |
| 2006/0248387 A1 | 11/2006 | Nicholson et al. | |
| 2007/0174546 A1 | 7/2007 | Lee | |
| 2007/0220202 A1 | 9/2007 | Sutardja et al. | |
| 2007/0288692 A1 | 12/2007 | Bruce et al. | |
| 2008/0005462 A1 | 1/2008 | Pyeon et al. | |
| 2008/0040537 A1 | 2/2008 | Kim | |
| 2008/0059694 A1 | 3/2008 | Lee | |
| 2008/0130156 A1 | 6/2008 | Chu et al. | |
| 2008/0141054 A1 | 6/2008 | Danilak | |
| 2008/0141055 A1 | 6/2008 | Danilak | |
| 2008/0177938 A1 | 7/2008 | Yu | |
| 2008/0209114 A1 | 8/2008 | Chow et al. | |
| 2008/0215800 A1 | 9/2008 | Lee et al. | |
| 2008/0222353 A1 | 9/2008 | Nam et al. | |
| 2008/0244164 A1 | 10/2008 | Chang et al. | |
| 2008/0256287 A1 | 10/2008 | Lee et al. | |
| 2008/0294846 A1 | 11/2008 | Bali et al. | |
| 2008/0307270 A1 | 12/2008 | Li | |
| 2009/0019218 A1 | 1/2009 | Sinclair et al. | |
| 2009/0024793 A1 | 1/2009 | Fontenot et al. | |
| 2009/0031072 A1 | 1/2009 | Sartore | |
| 2009/0043831 A1 | 2/2009 | Antonopoulos et al. | |
| 2009/0103203 A1 | 4/2009 | Yoshida | |
| 2009/0106518 A1 | 4/2009 | Dow | |
| 2009/0144501 A2 | 6/2009 | Yim et al. | |
| 2009/0150599 A1 | 6/2009 | Bennett | |
| 2009/0172324 A1 | 7/2009 | Han et al. | |
| 2009/0249168 A1 | 10/2009 | Inoue | |
| 2009/0271562 A1 | 10/2009 | Sinclair | |
| 2009/0327603 A1 | 12/2009 | McKean et al. | |
| 2010/0088459 A1 | 4/2010 | Arya et al. | |
| 2010/0169604 A1 | 7/2010 | Trika et al. | |
| 2010/0174849 A1 | 7/2010 | Walston et al. | |
| 2010/0250793 A1 | 9/2010 | Syu | |
| 2010/0268881 A1 | 10/2010 | Galchev et al. | |
| 2011/0082985 A1 | 4/2011 | Haines et al. | |
| 2011/0099323 A1 | 4/2011 | Syu | |
| 2011/0283049 A1 | 11/2011 | Kang et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0132638 A1 | 5/2013 | Horn et al. | |
| 2013/0145106 A1 | 6/2013 | Kan | |
| 2013/0290793 A1 | 10/2013 | Booth et al. | |
| 2014/0059405 A1 | 2/2014 | Syu et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |

OTHER PUBLICATIONS

Non-Volatile Memory Host Controller Interface revision 1.0 specification available for download at http://www.intel.com/standards/nvmhci/index.htm. Ratified on Apr. 14, 2008, 65 pages.

Hannes Payer, et al., "Combo Drive: Optimizing Cost and Performance in a Heterogeneous Storage Device", In First Workshop on Integrating Solid-state Memory into the Storage Hierarchy, Mar. 2009, 8 pages.

X. Wu and A. L. N. Reddy. Managing storage space in a flash and disk hybrid storage system. IEEE MASCOTS Conf., Sep. 2009, 4 pages.

U.S. Appl. No. 13/105,785, filed May 11, 2011, to Boyle et al., 19 pages.

* cited by examiner

VARYING DATA REDUNDANCY IN STORAGE SYSTEMS

BACKGROUND

1. Technical Field

This disclosure relates to disk drives, including but not limited to hybrid hard drives. More particularly, the disclosure relates to systems and methods for varying data redundancy in solid-state memory of a disk drive.

2. Description of the Related Art

Non-volatile memory devices typically provide better performance for reading and writing data than magnetic media. Accordingly, in storage devices it is advantageous to utilize non-volatile memory for storing data. However, a problem with using non-volatile memory for storing data is that reliability of non-volatile memory degrades over time.

Non-volatile memory devices can typically endure a limited number of write cycles over their useful life. Various factors can contribute to data errors in non-volatile memory devices, which include charge loss or leakage over time, read disturb, and device wear caused by program-erase cycles. Non-volatile memory degradation can cause stored data to be corrupted. For example, when the number of bit errors on a read operation exceeds the ECC (error correction code) correction's capability of the non-volatile memory device, a read operation fails.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

Figure 1:
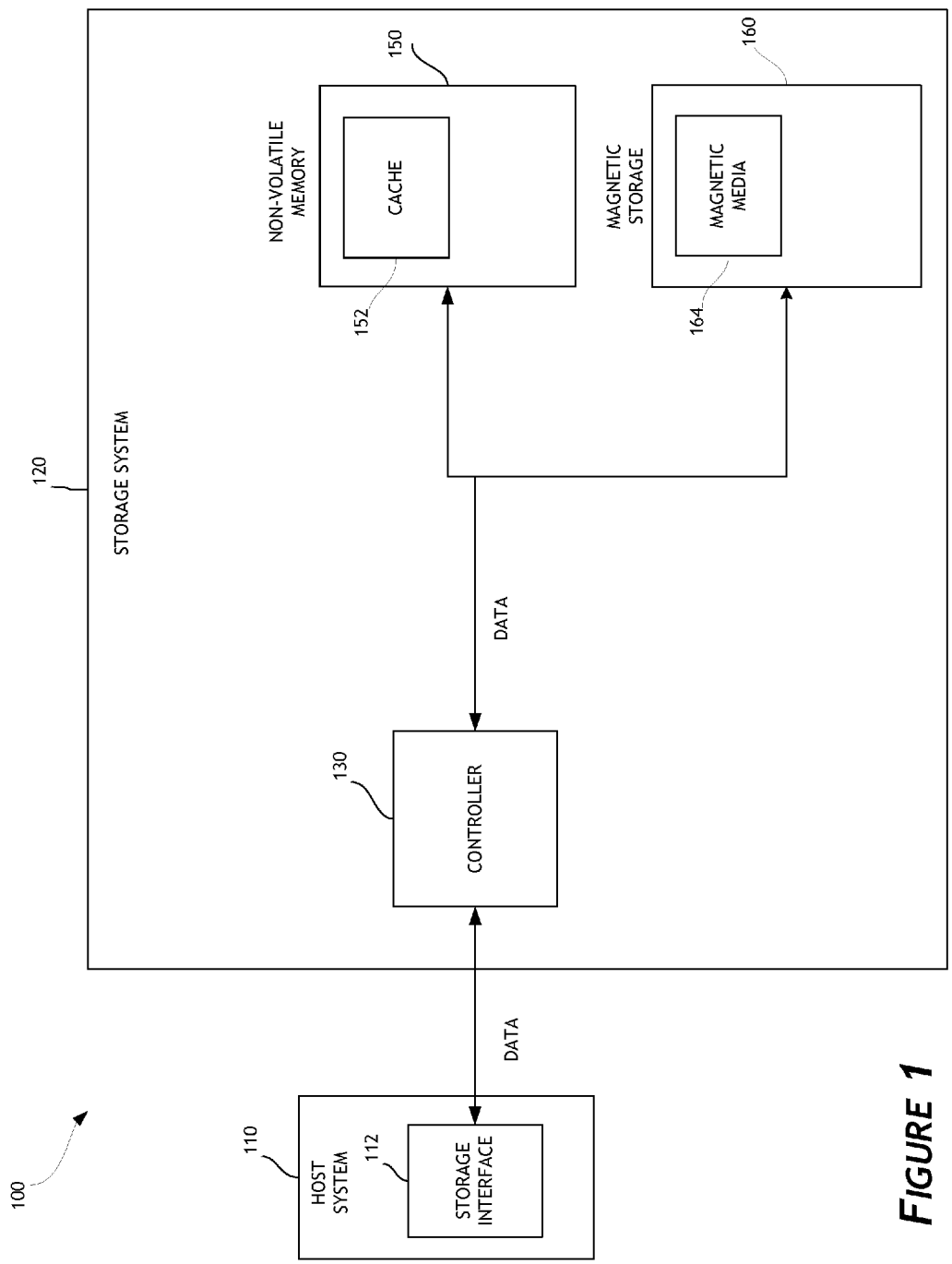
FIG. 1 is a block diagram illustrating a storage device that implements mechanisms for varying data redundancy in accordance with one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Non-volatile memory devices (NVM) (e.g., flash memory and other types of solid-state memory devices) store information in an array of memory cells. In single-level cell (SLC) non-volatile memory, each cell stores a single bit of information. In multi-level cell (MLC) non-volatile memory, each cell stores two or more bits of information. Non-volatile memory has a limited usable life that is measured by the number of times data can be written to a specific NVM location. As NVM wear increases (e.g., number of program-erase cycles increases), the reliability and data retention of the NVM decreases. MLC non-volatile memory (e.g., MLC NAND) is cheaper than SLC non-volatile memory, but tends to have slower access time, lower endurance, and lower data retention.

To improve performance, some disk drives take advantage of the speed of non-volatile memory to store certain data in non-volatile memory. This data can include frequently accessed data and data accessed at start-up. Disk drives that comprise non-volatile memory cache in addition to magnetic storage are referred to as "hybrid hard disk drives" or "hybrid hard drives" throughout this disclosure. In some hybrid hard drives, MLC NVM can be a good choice for cache storage due to its low cost and high storage density. Non-volatile memory is typically used both as read cache (e.g., a copy of data exists in magnetic storage) and write cache (e.g., data stored in NVM cache is a more recent version than data stored in magnetic storage).

In some embodiments of the present invention, redundancy of data stored in an NVM cache of a hybrid hard drive is increased as the NVM wears out. When reliability (e.g., error rate) of the NVM device falls below a threshold, data redundancy can be implemented to counteract the degradation of reliability of the NVM. In some embodiments, redundancy can be implemented using RAID (Redundant Array of Independent Disks) techniques. For example, when data mirroring or shadowing (e.g., RAID 1) is used, two or more copies of data are written to different locations in the NVM. In case data stored in one location becomes corrupted (e.g., error rate exceeds the ECC capability) and cannot be recovered, a "mirror" copy of the data is used instead. As another example, when RAID parity (e.g., RAID 3, 4, 5, 6, 50, 60, etc.) is used, redundant information or "parity" data is created and written, along with data, to the NVM. When data stored in the NVM becomes corrupted and cannot be recovered, parity data can be is used to reconstruct the data. In some embodiments, varying redundancy of data stored in non-volatile memory cache allows the hybrid hard drive to continue providing improved performance despite the degradation of the NVM's reliability, and even as the NVM nears the end of its usable life. In addition, the effective endurance of the NVM can be extended, which can correspond to using an NVM module that guarantees a smaller number of program-erase cycles that can be endured. This can result in cost reductions of the hybrid hard drive. Moreover, caching data in the non-volatile memory can result in improved power consumption.

System Overview

FIG. 1 illustrates a storage system 100 that implements improved caching mechanisms in accordance with one embodiment of the invention. As shown, a storage system 120 (e.g., a hybrid hard drive) includes a controller 130, non-volatile storage memory module 150, which comprises cache 152, and magnetic storage module 160, which comprises magnetic media 164 (e.g., a magnetic disk). The non-volatile memory module 150 can comprise one or more non-volatile solid-state memory arrays. The controller 130 can be configured to receive data and/or storage access commands from a storage interface module 112 (e.g., a device driver) in a host system 110. Storage access commands communicated by the storage interface 112 can include write and read commands issued by the host system 110. Read and write commands can specify a logical block address in the storage system. The controller 130 can execute the received commands in the non-volatile memory module 150 or in the magnetic storage module 160. In one embodiment, the controller can include memory (e.g., DRAM) for storing data, such as system tables.

The non-volatile memory module 150 is preferably implemented using NAND flash memory devices. Other types of solid-state memory devices can alternatively be used, including flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. In one embodiment, the memory devices are preferably MLC devices, although SLC memory devices, or a combination of SLC and MLC devices may be used in some embodiments.

Storage system 120 can store data communicated by the host system 110. That is, the storage system 120 can act as memory storage for the host system 110. To facilitate this function, the controller 130 can implement a logical interface. Logical interface can present to the host system 110 storage system's memory as a set of logical addresses (e.g., contiguous address) where data can be stored. Internally, the controller 130 can map logical addresses to various physical memory addresses in the magnetic media 164 and/or the non-volatile memory module 150.

In one embodiment, at least a portion of the non-volatile memory module 150 can be used as cache 152. In another embodiment, entire non-volatile memory module 150 can be used as cache. The controller 130 can store data communicated by the host system 110 in the non-volatile memory. In one embodiment, non-volatile memory cache 152 can be used as a read cache and/or a write cache. When the non-volatile memory is used as a read cache, a copy of data also exists in the magnetic storage 160. When non-volatile memory is used as a write cache, data stored in non-volatile memory is the most recent version than data stored in the magnetic storage 160. To improve performance of the storage system 120 and/or host system 110, in some embodiments, various types of data can be stored in non-volatile memory cache, including frequently accessed data, data accessed at start-up (e.g., following a reset or power down), system data, sequentially accessed data, etc.

Varying Data Redundancy

Figure 2:
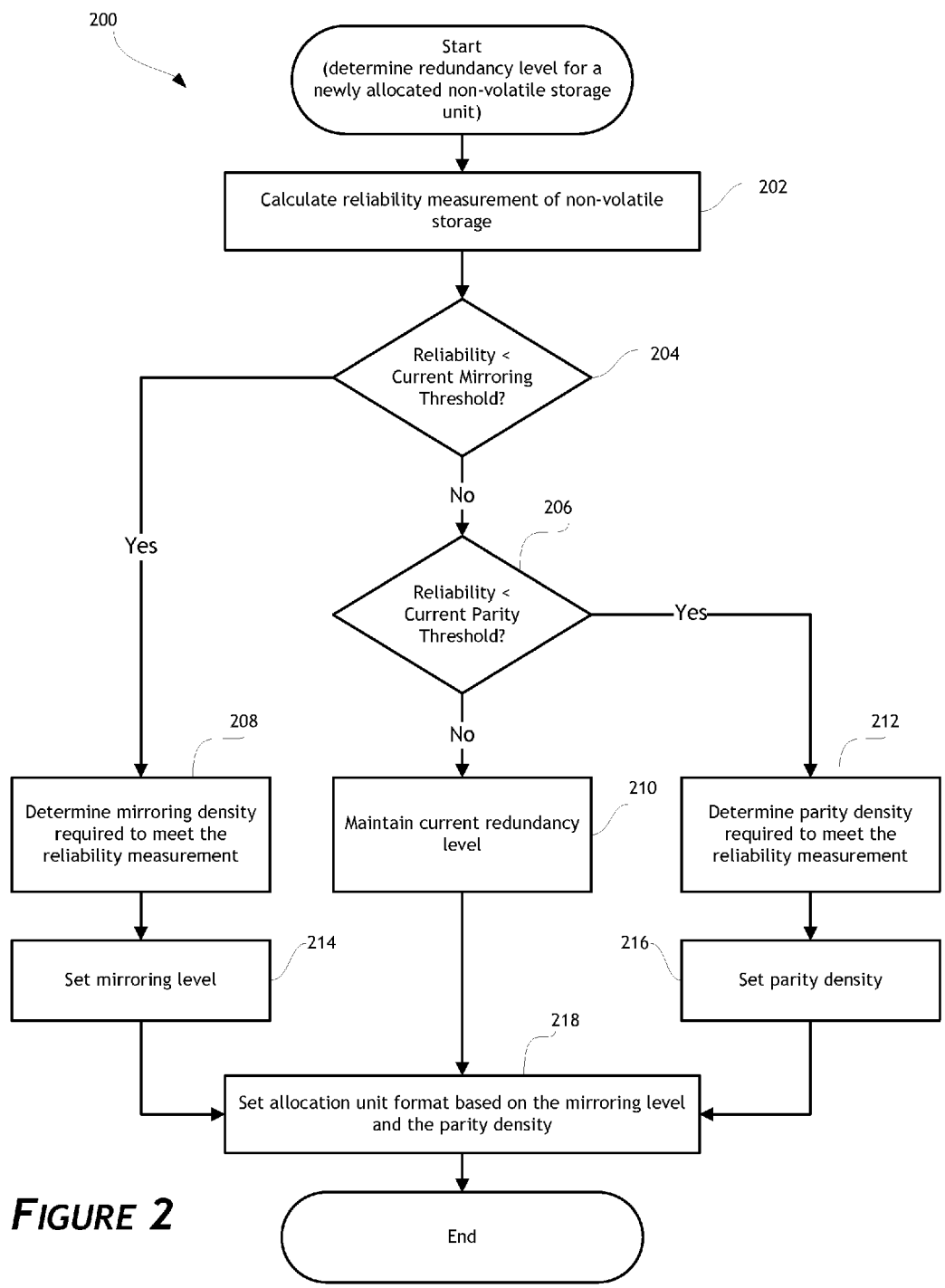
FIG. 2 is a flow diagram illustrating mechanisms for varying data redundancy in accordance with one embodiment of the invention.

FIG. 2 illustrates mechanisms for varying data redundancy in accordance with one embodiment of the invention. The process 200 can be implemented by the controller 130 of a storage system 120, such as a hybrid disk drive. In one embodiment, the process 200 is executed when a new non-volatile memory data storage unit is allocated for data to be written to non-volatile memory (e.g., in response to monitoring of reliability of non-volatile memory). The process 200 starts in block 202 where a reliability measure of non-volatile memory is calculated. In one embodiment, the reliability measurement can correspond to or reflect the remaining usable life of the non-volatile memory. The remaining usable life can correspond to the number of remaining program-erase cycles that the NVM can endure. For example, certain types of NAND NVM can endure between 3,000 and 100,000 program-erase cycles. In another embodiment, the remaining usable life (or reliability measure) can be determined based partly or wholly on the total number of bytes that have been written to non-volatile memory.

In one embodiment, the remaining usable life (or reliability measure) can be based partly or wholly on a number of errors encountered when reading data stored in non-volatile memory. Non-volatile memory can degrade and wear out, which can cause corruption of stored data. With NAND flash memory, for example, data corruption can be caused by a program disturb (e.g., data not intended to be programmed is nonetheless changed by a program operation directed to adjacent NVM blocks), read disturb (e.g., data not intended to be read is changed by a read operation directed to adjacent NVM pages), data loss (e.g., charge loss over an extended storage period), etc. Various error correction code (ECC) mechanisms can be used for detecting and correcting data corruption. In one embodiment, the number of bit corruptions detected and/or fixed by the ECC mechanism can be monitored during the execution of read operations. The number of bit corruptions can provide a measure of remaining usable life of non-volatile memory. This measure can be determined, for example, by comparing the average number of bits corruptions to a set of tiered thresholds.

The remaining usable life (or reliability measure) can also be determined based partially or wholly on voltage threshold levels or voltage reference values selected or determined when reading data from MLC flash memory. The remaining usable life can correspond to a voltage threshold level selected from a range of possible threshold levels during reading data so that data errors are reduced or minimized. In another embodiment, the remaining usable life can correspond to the adjustment of programming algorithm parameters (e.g., programming time, erase time, etc.) when storing data in non-volatile memory.

In block 204, the process determines whether data should be mirrored. Alternatively, some initial redundancy (e.g., parity or mirroring) could be used to account for reliability overhead needed to account for to page read failures commonly encountered in new NVM modules. In one embodiment, the process 200 compares the reliability measurement determined in block 202 to a current mirroring threshold. The current mirroring threshold can be a preset value (e.g., a value corresponding to initial redundancy) or can, for example, be adjusted as non-volatile memory degrades. If the reliability measurement is below the current mirroring threshold, the process transitions to block 208 where it determines a mirroring density that corresponds to (e.g., is required to meet) the reliability measurement. In one embodiment, mirroring density can correspond to a number of copies of data that are written to non-volatile memory. For example, more copies of data (e.g., 2, 3, 4, etc.) can be written to non-volatile memory as its reliability degrades. After the mirroring density is determined, the process transitions to block 214 where the mirroring level is set to the mirroring density. After this operation is completed, the process transitions to block 218 where an allocation unit is created based on the determined mirroring density. In one embodiment, the format of the allocation unit reflects the mirroring density (e.g., number of copies of data to be written to non-volatile memory).

In one embodiment, if the reliability measurement is above (or equal to) the current mirroring threshold, the process transitions to block 206 where it compares the reliability measurement determined in block 202 to a current parity threshold. The parity threshold can be a preset value (e.g., a value corresponding to the initial redundancy) or can, for example, be adjusted as non-volatile memory degrades. If the reliability measurement is below the current parity threshold, the process transitions to block 212 where it determines a parity density that corresponds to (e.g., is required to meet) the reliability measurement. In one embodiment, parity density can correspond to a number of data sectors (e.g., non-volatile memory pages) for which parity data is created and stored in non-volatile memory. For example, parity data can be created for a group of N storage units (e.g., pages), where N can be set to 32, 16, 8, 4, or 2. In one embodiment, parity density is increased (i.e., N is decreased) as the reliability of non-volatile memory degrades. After the parity density is determined, the process transitions to block 216 where the parity level is set to the parity density. After this operation is completed, the process transitions to block 218 where the allocation unit is created based on the determined parity density. In one embodiment, the format of the allocation unit reflects the parity density (e.g., number of pages for which parity data is created).

In one embodiment, when the remaining usable life is determined to be above (or equal to) the current mirroring and parity thresholds, the process 200 transitions to block 210. No data redundancy can be utilized since the non-volatile memory has been determined to have sufficient reliability. Alternatively, some initial redundancy could be used. The process transitions to block 218 where the allocation unit is created based on no redundancy or on initial redundancy. In one embodiment, the format of the allocation unit reflects no redundancy (e.g., no mirroring and no parity data). In another embodiment, the format of the allocation unit reflects initial redundancy (e.g., initial parity or mirroring). Once the allocation unit has been created, the process 200 terminates.

In one embodiment, the remaining usable life can be determined by a signal processing subsystem. The non-volatile memory module 150 can include a bridge device coupled with non-volatile memory module via an interface such as ONFI. The bridge device can be further configured to communicate with the controller 130 over a high speed interface such as PCIe and to provide to the controller physical, page-level access/control to non-volatile memory. The bridge device can perform basic signal processing and channel management of non-volatile memory. This architecture is described in a co-pending patent application Ser. No. 13/226,393, entitled "SYSTEMS AND METHODS FOR AN ENHANCED CONTROLLER ARCHITECTURE IN DATA STORAGE SYSTEMS," filed Sep. 6, 2011, the disclosure of which is hereby incorporated by reference in its entirety. In other embodiments, a bridge device may not be used and the non-volatile memory module 150 may be managed directly by the controller 130.

Figure 3:
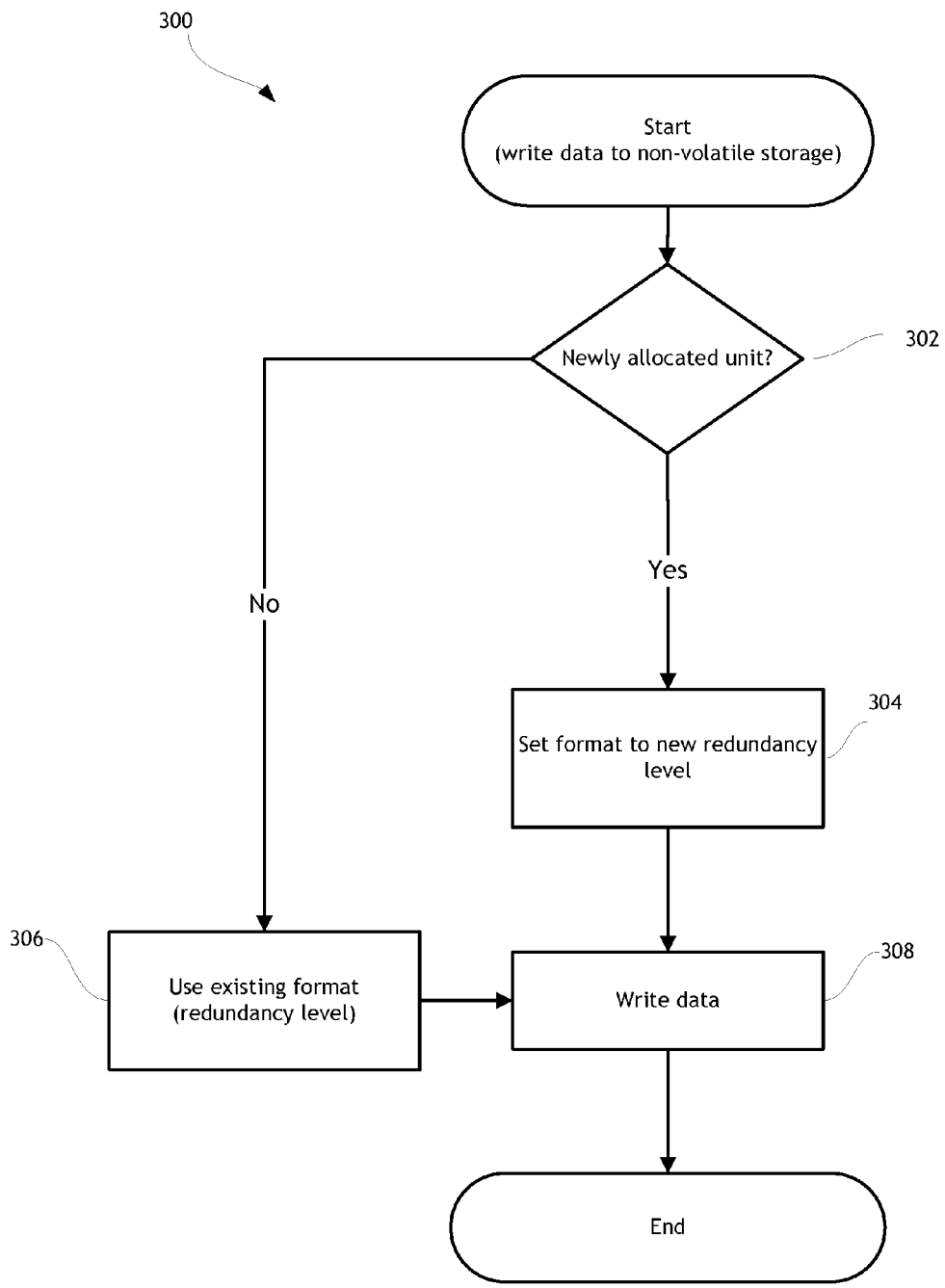
FIG. 3 is a flow diagram illustrating storing data in non-volatile memory in accordance with one embodiment of the invention.

As explained above, the process 200 is preferably executed when a new non-volatile memory data storage unit is allocated for data to be written to non-volatile memory (e.g., in response to monitoring of reliability of non-volatile memory). Data to be written can be communicated by the host via a write command. FIG. 3 illustrates storing data in non-volatile memory in accordance with one embodiment of the invention. The process 300 can be implemented by the controller 130 of a storage system 120. The process 300 starts in block 302 where it determines whether a data storage unit to be written to non-volatile memory is a newly allocated unit. In one embodiment, non-volatile memory data storage units of a different format than the current format cannot be used in the middle of a write operation.

If the unit is not a newly allocated unit, the process transitions to block 306 where it sets a redundancy level to the already determined allocation unit format (e.g., already determined mirroring level, parity level, or no redundancy). The process transitions to block 308 where data is written to non-volatile memory. If, in block 302, it is determined that the unit is a newly allocated unit, the process transitions to block 304 where it sets the allocation unit format to the redundancy level to the level determined in blocks 210, 214, and/or 216 of FIG. 2. The process transitions to block 308 where data is stored in non-volatile memory. The process 300 terminates when data is written.

Examples of Varying Data Redundancy

Figure 4:
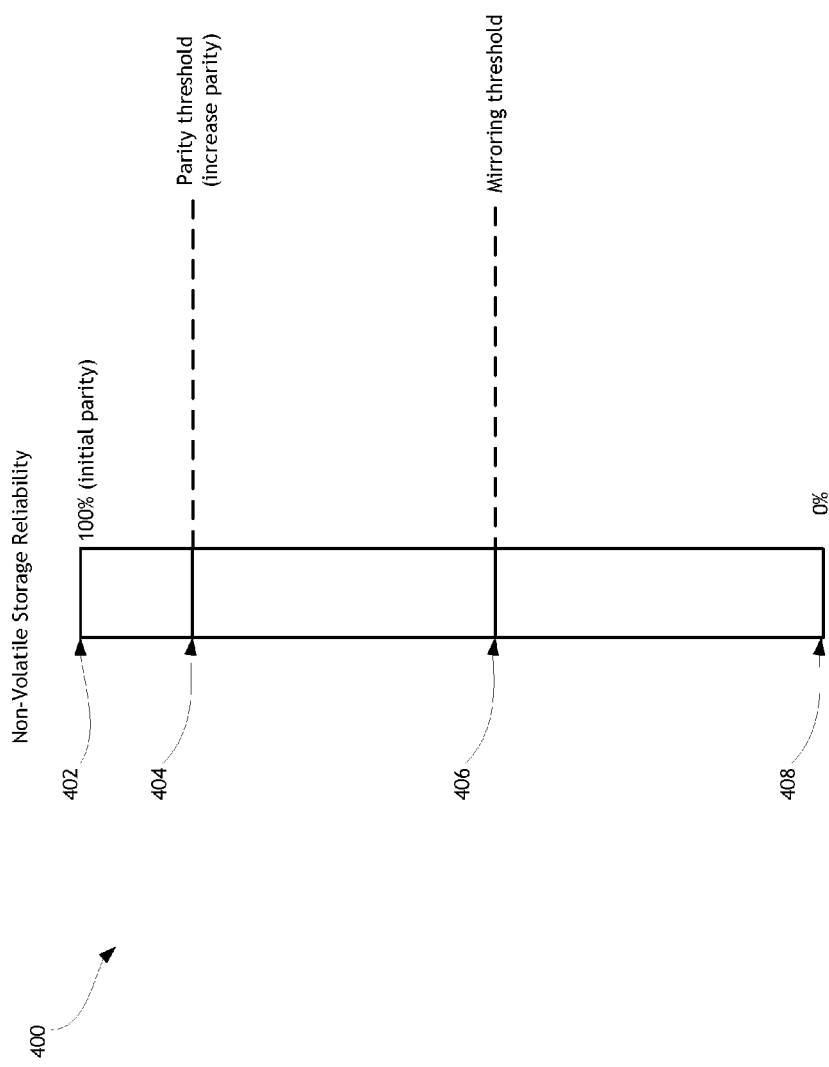
FIGS. 4-6 illustrate several examples for varying data redundancy in accordance with some embodiments of the invention.

FIG. 4 illustrates an example 400 of varying data redundancy according to one embodiment. As is shown, threshold 402 reflects that the non-volatile memory 150 is fully reliable (e.g., the non-volatile memory has substantially its entire usable life left). No data redundancy is needed to be utilized while reliability of the non-volatile memory is above threshold 404. Alternatively, some initial redundancy (e.g., parity) could be used to account for reliability overhead needed to account for to page read failures commonly encountered in new NVM modules. When the reliability of the non-volatile memory falls below the threshold 404, parity is used or can be increased for redundancy. When the reliability of the non-volatile memory falls below threshold 406, mirroring is used for redundancy, as mirroring allows for recovery from more severe types of data corruption. Mirroring may thereafter be used until the non-volatile memory reaches the end of its life, as reflected by threshold 408. Although mirroring is used in the embodiment of FIG. 4, other forms of increased redundancy may alternatively be used; for example, an ECC level may alternatively be used. The ECC level may provide for increased redundancy relative to the use of parity, but less redundancy than is provided by mirroring.

Figure 5:
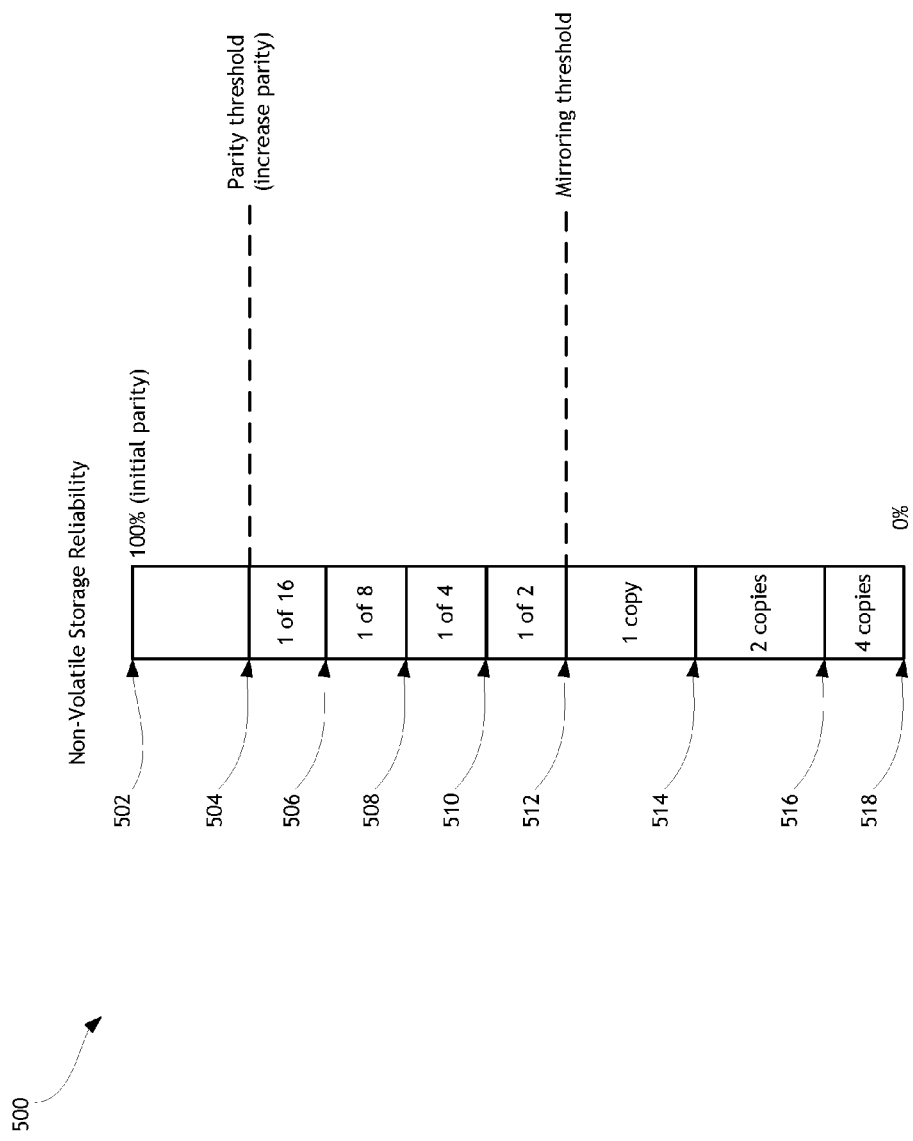

FIG. 5 illustrates an example 500 of varying data redundancy according to another embodiment. As is shown, threshold 502 reflects that the non-volatile memory 150 is fully reliable (e.g., non-volatile memory has substantially its entire usable life left). No data redundancy is needed while reliability of non-volatile memory is above threshold 504. Alternatively, some initial redundancy (e.g., parity) could be used to account for reliability overhead needed to account for to page read failures commonly encountered in new NVM modules. When the reliability of the non-volatile memory falls below threshold 504, parity is used or can be increased for redundancy. Parity density can be increased as the reliability of the non-volatile memory decreases. In particular, while reliability is between thresholds 504 and 506, parity data is created for every 16 storage unit (e.g., page). When the reliability decreases to between thresholds 506 and 508, parity data is created for every 8 storage units. When the reliability decreases to between thresholds 508 and 510, parity data is created for every 4 storage units. When the reliability decreases to between thresholds 510 and 512, parity data is created for every 2 storage units.

When the reliability falls below threshold 512, mirroring is used for redundancy. In particular, while reliability is between thresholds 512 and 514, one additional copy of data is stored in non-volatile memory. When reliability decreases to being between thresholds 514 and 516, two additional copies of data are stored in non-volatile memory. When reliability decreases to being between thresholds 516 and 518, four additional copies of data are stored in non-volatile memory. Threshold 518 reflects the end of life of non-volatile memory.

Figure 6:
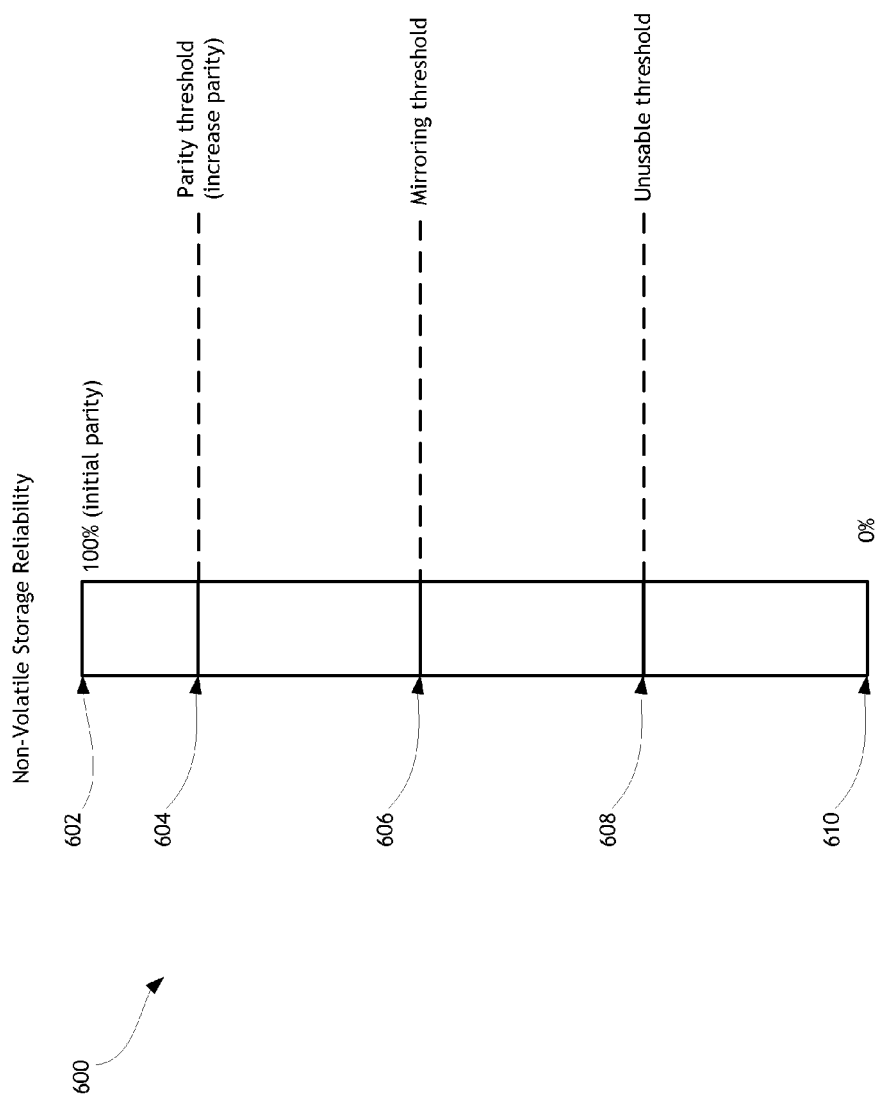

FIG. 6 illustrates an example 600 of varying data redundancy according to another embodiment. As is shown, threshold 602 reflects that the non-volatile memory 150 is fully reliable (e.g., non-volatile memory has substantially its entire usable life left). No data redundancy is needed while reliability of non-volatile memory is above threshold 604. Alternatively, some initial redundancy (e.g., parity) could be used to account for reliability overhead needed to account for to page read failures commonly encountered in new NVM modules. When the reliability of non-volatile memory falls below threshold 604, parity is used or can be increased for redundancy. When the reliability of non-volatile memory falls below threshold 606, mirroring is used for redundancy. Mirroring is used as long as the non-volatile memory reliability exceeds threshold 608. However, when the reliability falls below threshold 608, which reflects that the non-volatile memory has degraded to the point where it has become unusable, data is no longer written to the non-volatile memory. In one embodiment, data already stored in non-volatile memory can be transferred to the magnetic media. In another embodiment, data already stored in non-volatile memory can remain there (e.g., the non-volatile memory is used as read cache) until non-volatile memory reaches the end of its life, as reflected by threshold 610.

As will be apparent, numerous other levels and types of redundancy can additionally or alternatively be used. For example, in some embodiments, the redundancy level may be increased over time by changing an ECC level or algorithm (or parameters of algorithm) used to generate ECC data.

CONCLUSION

In some embodiments, varying data redundancy allows hybrid hard drives to improve performance and reduce cost. Redundancy of data stored in non-volatile memory can be increased as non-volatile memory degrades. Various types RAID parity and/or mirroring mechanisms can be used depending on the measured reliability of the non-volatile memory. Redundant data can be used to recover data stored in the non-volatile memory in case of data corruption. Varying the redundancy of data stored in the non-volatile memory cache provides performance improvement even as the non-volatile memory's reliability degrades. Costs are reduced because the cheaper non-volatile memory that guarantees a lower number of program-erase cycles can be utilized.

Other Variations

As used in this application, "non-volatile memory" typically refers to solid-state memory such as, but not limited to, NAND flash. However, the systems and methods of this disclosure may also be useful in more conventional hard drives and hybrid drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of redundancy can be implemented. In addition, the actual steps taken in the processes shown in FIGS. 2-6 may differ from those shown in the figures. For example, thresholds depicted in FIGS. 4-6 could be reversed. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a storage system comprising non-volatile memory, a method of caching data in the non-volatile memory, the method comprising:
   configuring a write operation of data to the non-volatile memory, the configuring comprising:
      determining a reliability measurement of the non-volatile memory;
      comparing the reliability measurement with first and second thresholds, the first threshold indicating higher reliability of the non-volatile memory than the second threshold;
      if the reliability measurement falls below the first threshold but does not fall below the second threshold, determining a parity level and setting a redundancy level to the parity level;
      if the reliability measurement falls below the second threshold, determining a mirroring level and setting the redundancy level to the mirroring level;
   writing data to the non-volatile memory using the set redundancy level; and
   increasing at least one of the parity and mirroring level when the reliability measurement has been determined to decrease.

2. The method of claim 1, wherein when the redundancy level is set to the mirroring level, writing data to the non-volatile memory further comprises writing a number of copies of data corresponding to the mirroring level.

3. The method of claim 1, wherein when the redundancy level is set to the parity level, writing data to the non-volatile memory further comprises:
   creating a plurality of parity data units corresponding to data, wherein a number of parity data units in the plurality corresponds to the parity level; and
   writing data along with the plurality of parity data units to the non-volatile memory.

4. The method of claim 1, wherein the reliability measurement corresponds at least in part to a remaining usable life of the non-volatile memory.

5. The method of claim 4, wherein the remaining usable life corresponds at least in part to one of: a number of remaining program-erase cycles of the non-volatile memory and a number of read errors of the non-volatile memory.

6. The method of claim 4, wherein:
   the non-volatile memory comprises multi-level cell solid-state memory; and
   the remaining usable life corresponds at least in part to an adjustment of a voltage threshold of the multi-level cell memory.

7. The method of claim 1, wherein non-volatile memory comprises solid-state memory.

8. The method of claim 1, wherein the writing further comprises:
   determining whether a write operation has been initiated;
   if the write operation has not been initiated, writing data to the non-volatile memory using the set redundancy level; and
   if the write operation has been initiated, writing data to the non-volatile memory using a previous redundancy level.

9. The method of claim 1, wherein writing data to the non-volatile memory comprises:

if a new data storage unit has been allocated for writing data to the non-volatile memory, writing data to the non-volatile memory using the new data storage unit, the new data storage unit formatted according to the set redundancy level; and if the new data storage unit has not been allocated for writing data to the non-volatile memory, writing data to the non-volatile memory using a previously allocated data storage unit, the previously allocated data storage unit formatted according a previous redundancy level.

10. A storage system for storing data received from a host system, the system comprising:
a non-volatile solid state memory configured to store data received from the host system; and
a controller configured to:
determine a reliability measurement of the non-volatile memory;
adjust a redundancy level used for writing data to the non-volatile memory based at least partly on the reliability measurement, wherein the redundancy level is increased when the reliability measurement has been determined to decrease; and
write data to the non-volatile memory using the adjusted redundancy level.

11. The system of claim 10, wherein the controller is configured to write data to the non-volatile memory by:
if a new data storage unit has been allocated for writing data to the non-volatile memory, writing data to the non-volatile memory using the new data storage unit, the new data storage unit formatted according to the set redundancy level; and
if the new data storage unit has not been allocated for writing data to the non-volatile memory, writing data to the non-volatile memory using a previously allocated data storage unit, the previously allocated data storage unit formatted according a previous redundancy level.

12. The system of claim 10, wherein the controller is further configured to increase the redundancy level of data to be written to the non-volatile memory when the determined reliability measurement indicates a degradation of reliability.

13. The system of claim 10, wherein the reliability measurement corresponds to at least one of: a number of remaining program-erase cycles of the non-volatile memory and a number of read errors of the non-volatile memory.

14. The system of claim 10, wherein the reliability measurement corresponds to an adjustment of programming algorithm parameters.

15. The system of claim 10, wherein the controller is further configured to:
compare the reliability measurement to a parity threshold; and
if the reliability measurement falls below the parity threshold, determine a parity level based at least in part on the reliability measurement and set the redundancy level to the determined parity level.

16. The system of claim 15, wherein the controller is further configured to:
compare the reliability measurement to a mirroring threshold, wherein the parity threshold indicates higher reliability of the non-volatile solid state memory than the mirroring threshold; and
if the reliability measurement falls below the mirroring threshold, determine a mirroring level based at least in part on the reliability measurement and set the redundancy level to the determined mirroring level.

17. The system of claim 16, wherein:
when the redundancy level is set to the mirroring level, the controller is further configured to write a number of copies of data to the non-volatile memory, the number of copies corresponding to the mirroring level; and
when the redundancy level is set to the parity level, the controller is further configured to:
create a plurality of parity data units corresponding to data, wherein the number of parity data units in the plurality of parity data units corresponds to the parity level; and
write data along with the plurality of parity data units to the non-volatile memory.

18. The system of claim 10, further comprising a magnetic medium configured to store data received from the host, wherein the controller is further configured to write data to the magnetic medium when the reliability measurement falls below a minimum reliability threshold.

19. The system of claim 10, wherein the controller is further configured to determine the reliability measurement by receiving reliability information from a signal processing subsystem.

20. The system of claim 19, wherein the signal processing subsystem is part of a bridge device coupled to the non-volatile memory.

21. The system of claim 10, wherein the controller is further configured to:
if a write operation has not been initiated, write data to the non-volatile memory using the adjusted redundancy level; and
if the write operation has been initiated, write data to the non-volatile memory using a previous redundancy level.

* * * * *